No. 757,824. PATENTED APR. 19, 1904.
F. S. MARTIN.
TROLLEY BASE.
APPLICATION FILED SEPT. 4, 1903.
NO MODEL.
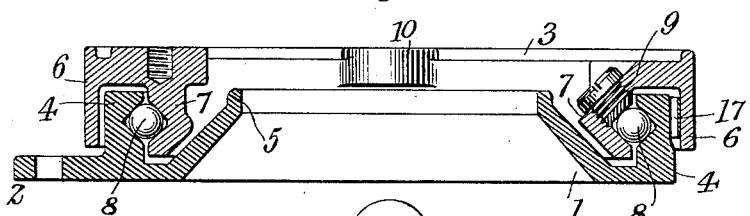
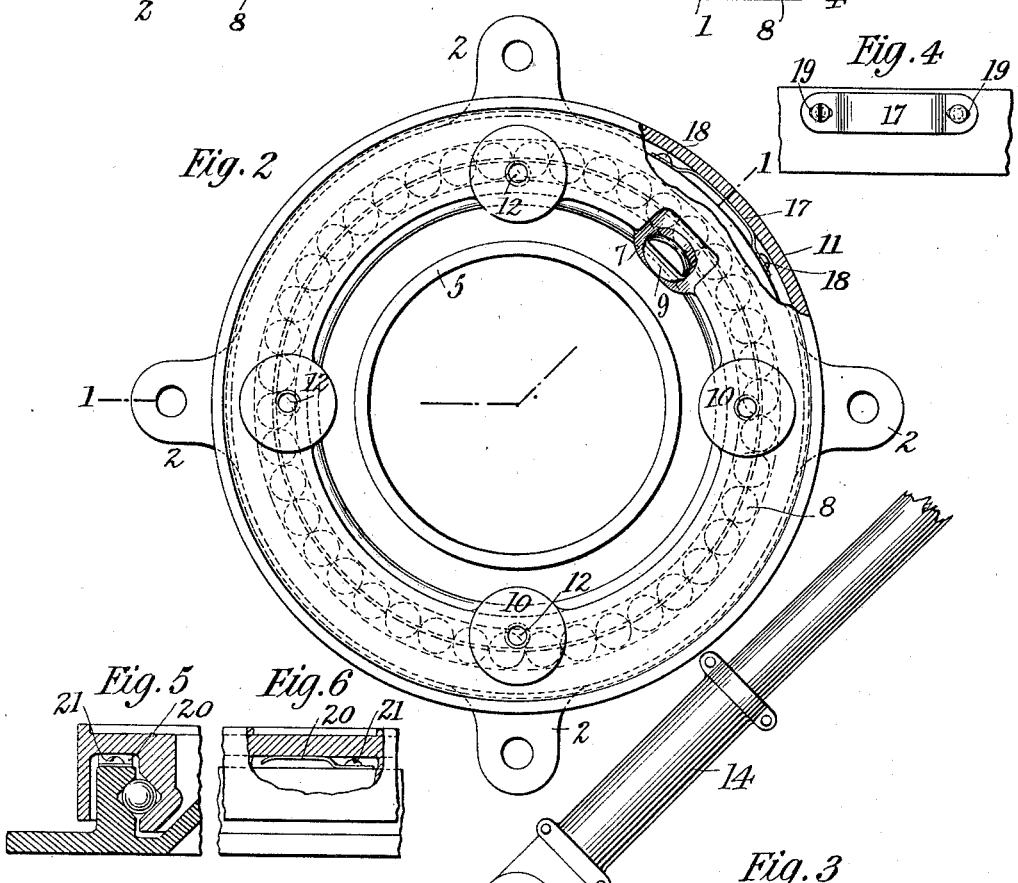
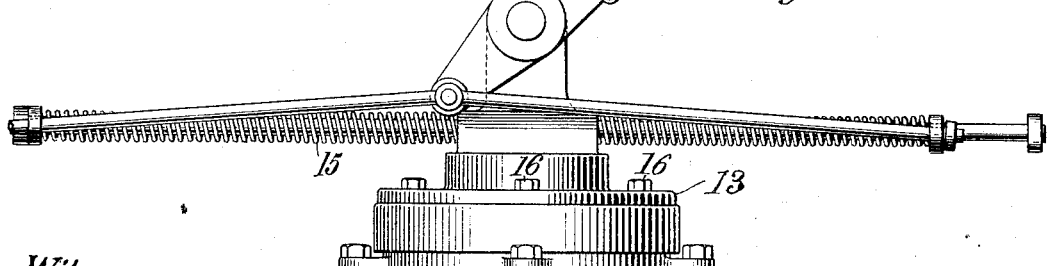
Witnesses:
Raphaël Netter
George H. Stockbridge
Frederick S. Martin, Inventor
by Charles A. Perry, Att'y No. 757,824.

Patented April 19, 1904.

UNITED STATES PATENT OFFICE.

FREDERICK S. MARTIN, OF PITTSBURG, PENNSYLVANIA, ASSIGNOR TO R. D. NUTTALL COMPANY, A CORPORATION OF PENNSYLVANIA.

TROLLEY-BASE.

SPECIFICATION forming part of Letters Patent No. 757,824, dated April 19, 1904.

Application filed September 4, 1903. Serial No. 171,852. (No model.)

*To all whom it may concern:*

Be it known that I, FREDERICK S. MARTIN, a citizen of the United States, and a resident of Pittsburg, county of Allegheny, State of Pennsylvania, have invented certain new and useful Improvements in Trolley-Bases, of which the following is a specification.

My invention relates to improvements in trolley-bases; and its object is to provide a device of this character which shall readily permit the movement of the trolley-arm to any desired position with relation to the wire with which it coöperates.

My invention will be clearly understood by reference to the accompanying drawings, in which—

Figure 1 is a vertical section of a trolley-base, taken along the line 1 1 in Fig. 2. Fig. 2 is a plan of the trolley-base. Fig. 3 is a side elevation thereof, including also a portion of the trolley-arm and the usual parts connected therewith; and Figs. 4, 5, and 6 are details of various forms of contact devices which may be used in connection with the trolley-base.

In the drawings, 1 is the lower part of my trolley-base, the same being provided with perforated lugs 2 2 2 2, by means of which the said part can be attached to the top of a car or other suitable support.

The trolley-base as a whole is composed of two parts, one of which is the part 1, already described, and the other the part 3, which is joined thereto in a manner which will presently be described. The part 1 is provided with a circular flange 4 and with a reëntrant portion 5, as shown. The part 3 is provided with a flange 6, which surrounds the flange 4, and is also provided with an inner flange 7, which is adapted to pass inside the flange 4, so that the flanges 6 and 7 lie on opposite sides of the said flange 4, forming a yoke in which the part 3 ends.

By referring to Fig. 1 it will be seen that the flange 4 and the flange 7 are so constructed as to leave between them a runway for steel balls 8 8, so that the two parts 1 and 3 will be supported with relation to each other in such a manner as to have a ball-bearing between them. The flanges 4 and 7 are suitably notched or bent, so as to provide appropriate bearings for the balls 8 8.

The flange 7 is pierced or perforated at one or more points and provided with one or more bolts or screws 9, serving to close the perforation or perforations, as the case may be. The connection between the parts 1 and 3 is made by removing the bolt or screw 9 and applying the parts 1 and 3 to each other in such a way that the flanges 6 and 7 will surround the flange 4. Thereupon the balls 8 8, sufficient in number to fill the opening between the flanges 4 and 7, may be inserted in place and the screw or bolt 9 may be reinserted in place. Thereupon a flexible connection will be formed between the parts 1 and 3, permitting free rotation of the part 3 with respect to the part 1, whereby the conditions sought for by the present invention are brought about.

To provide for the attachment to the trolley-base above described of a trolley-arm and spring of any usual character, I form upon the part 3 bosses 10 10 10 10, the upper surfaces of which are flush with the outer rim of the part 3. These bosses are provided with internal screw-threads 12 12 12 12 and a cap 13, carrying the trolley-arm 14, and the usual spring 15 is connected to the part 3 by means of bolts 16 16, which pass through the cap into the bosses and are secured within the screw-threaded portions thereof. By these means the cap 13 is firmly secured to the part 3 and the trolley-arm and its connected parts are made to partake of the flexibility of the connection between the part 3 and the part 1. In other words, when the cap 13 has been secured to the part 3 by the means above described and it is assumed that the trolley-arm and its connected parts are attached to the cap 13 in any appropriate way it is evident that a highly-flexible condition exists between the trolley-arm and its parts, all of which constitute the main design of the present invention.

Should it be deemed necessary or desirable to carry current from the trolley-base through the ball-bearing foot or base, means such as are illustrated in detail in Figs. 2, 4, 5, and 6 may be employed.

In Figs. 2 and 4, for example, I illustrate a copper contact-spring 17, which is attached to the circular flange 4 by means of screws 18 18 and bears against the flange 6, so as to make good electrical contact therewith. I provide slots 19 19 in the upper strip or spring 17, so as to allow a certain amount of play in the spring.

A somewhat different form of contact is illustrated in Figs. 5 and 6, wherein a copper spring 20, secured by a screw 21 to the top of the flange 4, bears against that portion of the part 3 which lies between the flange 6 and the flange 7.

I claim as my invention—

1. In a trolley-base, a suitable support in the form of a ring, a trolley-arm support in the form of a ring surrounding the first-named ring on both sides thereof, and a ball-bearing between the inner side of the first-named ring and the trolley-arm support.

2. In a trolley for electric railways, a trolley-arm, and a cap supporting the same, a ring to which the said cap is connected, the said ring ending in a yoke, a coöperating ring constituting a support for the structure as a whole and located between the arms of the said yoke, and a ball-bearing between the inner side of the supporting-ring and the inner arm of the yoke.

3. In a trolley-base, a suitable support, a coöperating part having a horizontal ball-bearing relation with said support, and a spring of good conducting material between the said support and the said coöperating part.

Signed at Pittsburg, in the county of Allegheny and State of Pennsylvania, this 28th day of August, A. D. 1903.

FREDERICK S. MARTIN.

Witnesses:
F. W. ESTEP,
MILTON RUPERT.